(12) United States Patent
Zhang et al.

(10) Patent No.: US 9,197,542 B2
(45) Date of Patent: Nov. 24, 2015

(54) SYSTEMS AND METHODS OF NETWORK RECONFIGURATION

(71) Applicant: Fujitsu Limited, Kawasaki-shi, Kanagawa (JP)

(72) Inventors: Qiong Zhang, Plano, TX (US); Paparao Palacharla, Richardson, TX (US); Chengyi Gao, Richardson, TX (US); Xi Wang, Murphy, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 267 days.

(21) Appl. No.: 13/755,967

(22) Filed: Jan. 31, 2013

(65) Prior Publication Data
US 2014/0215032 A1    Jul. 31, 2014

(51) Int. Cl.
*G06F 13/00* (2006.01)
*H04L 12/707* (2013.01)
*H04L 12/24* (2006.01)

(52) U.S. Cl.
CPC .............. *H04L 45/22* (2013.01); *H04L 41/04* (2013.01); *H04L 41/0896* (2013.01)

(58) Field of Classification Search
CPC ......... H04L 45/00; H04L 45/04; H04L 45/12; H04L 45/123; H04L 45/125; H04L 45/22; H04L 45/28; H04L 2012/562; H04L 41/0654; H04L 45/302; H04L 45/50; H04L 47/122; H04L 47/125; H04L 47/728; H04L 49/205; H04L 67/1038; H04L 41/04; H04L 41/0896; H04Q 3/66; H04W 40/02
USPC ................. 709/238–242, 220–222, 229, 223
See application file for complete search history.

(56) References Cited

U.S. PATENT DOCUMENTS

| | | | | |
|---|---|---|---|---|
| 5,253,161 | A * | 10/1993 | Nemirovsky et al. | 709/241 |
| 6,016,306 | A * | 1/2000 | Le Boudec et al. | 370/235 |
| 6,757,263 | B1 * | 6/2004 | Olds | 370/315 |
| 7,859,993 | B1 * | 12/2010 | Choudhury et al. | 370/217 |
| 2002/0141345 | A1 * | 10/2002 | Szviatovszki et al. | 370/238 |

OTHER PUBLICATIONS

Jing Wu; "A survey of WDM network reconfiguration: Strategies and triggering methods"; Computer Networks, No. 55; pp. 2622-2645, 2011.
Chan et al.; "Behaviors and Effectiveness of Rerouting: a Study"; IEEE; www.ieee.org; pp. 6, 2005.
Ho et al.; "Connection Level Active Rerouting in WDM Mesh Networks with Traffic Grooming Capability"; IEEE; www.ieee.org; pp. 6, 2006.

(Continued)

*Primary Examiner* — Kenneth R Coulter
(74) *Attorney, Agent, or Firm* — Baker Botts L.L.P.

(57) ABSTRACT

The present disclosure may include a method of reconfiguring a network. The method includes collecting a plurality of network demands, each of the plurality of network demands having a possible resource release by rerouting the network demand from its current path to a new path. The method further includes selecting a subset of the plurality of network demands that, if rerouted, has the highest resource release without resource contention. The method additionally includes rerouting the subset of the plurality of network demands, and, in response to rerouting the subset of the plurality of network demands, releasing resources no longer used by rerouted demands. The present disclosure may further include associated systems and apparatuses.

17 Claims, 13 Drawing Sheets

(56) References Cited

OTHER PUBLICATIONS

Solano et al.; "Analyzing Two Different Objectives of the WDM Lightpalh Reconfiguration Problem"; IEEE; www.ieee.org; pp. 7, 2009.

Jose et al.; "Connecting Rerouting/Network Reconfiguration"; Design of Reliable Communication Networks (DRCN); IEEE pp. 23-30, 2003.

Ahmed et al.; "Traffic Re-Optimization Strategies for Dynamically Provisioned WDM Networks"; Network of Excellence, Building the Future Optical Network Europe (BONE); pp. 6, 2011.

* cited by examiner

Possible reroutes
(A-E): A-D-E
(B-E): B-C-E
(C-D): C-E-D

Current demands
(A-E): A-D-C-E
(B-E): B-C-D-E
(C-D): C-B-A-D

Reroute, maintain previous connections
(A-E): A-D-E
(B-E): B-C-E
(C-D): C-B-A-D & C-D New possible reroutes
(A-E): none
(B-E): none
(C-D): C-D Possible absolute shortest path reroutes
(A-E): A-D-E
(B-E): B-C-E
(C-D): resources not available Current demands
(A-E): A-D-C-E
(B-E): B-C-D-E
(C-D): C-B-A-D

*Reroute, maintain previous connection*
(A-E): A-D-C-E & A-D-E
(B-E): B-C-D-E & B-C-E
(C-D): C-B-A-D

*Release previous connections new current demands*
(A-E): A-D-E
(B-E): B-C-E
(C-D): C-B-A-D Reroute, maintain previous connection
(A-E): A-D-E
(B-E): B-C-E
(C-D): C-B-A-D & C-D Possible absolute shortest path routes
(A-E): already shortest
(B-E): already shortest
(C-D): C-D

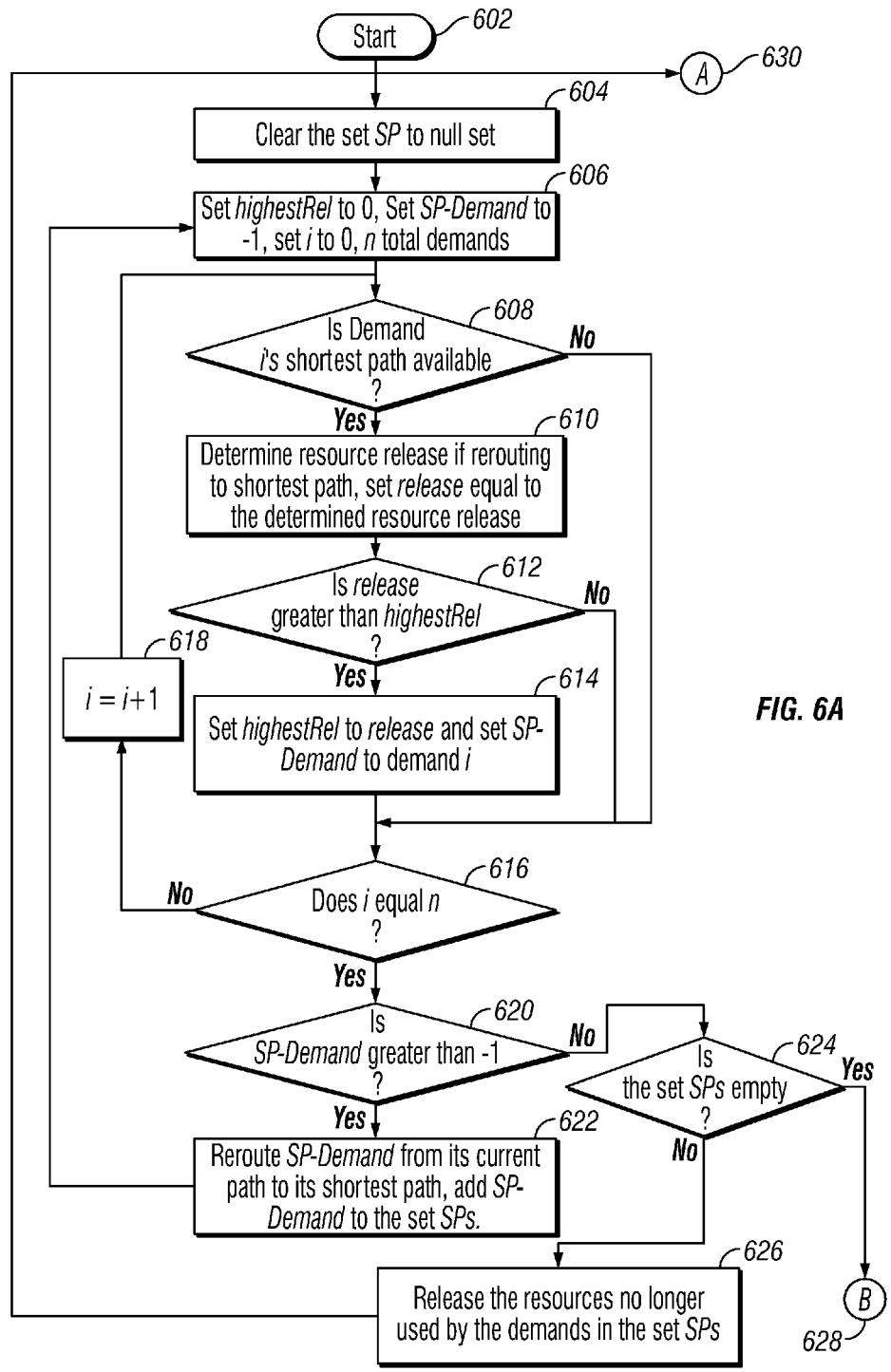

SYSTEMS AND METHODS OF NETWORK RECONFIGURATION

TECHNICAL FIELD

The present invention relates generally to the field of computer networking and more particularly to systems and methods of network reconfiguration.

BACKGROUND

Telecommunications systems, cable television systems and data communication networks may use networks to rapidly convey large amounts of information between remote points. Traffic may arrive and leave in various parts of such a network in dynamic fashion. Furthermore, the topology of such a network may change, and failure of portions of the network may occur. When this occurs, networks may be reconfigured to optimize network resource usage.

SUMMARY

In one embodiment, a method of reconfiguring a network includes collecting a plurality of network demands, each of the plurality of network demands having a possible resource release by rerouting the network demand from its current path to a new path. The method further includes selecting a subset of the plurality of network demands that, if rerouted, has the highest resource release without resource contention. The method additionally includes rerouting the subset of the plurality of network demands, and, in response to rerouting the subset of the plurality of network demands, releasing resources no longer used by rerouted demands.

BRIEF DESCRIPTION OF THE DRAWINGS

For a more complete understanding of the present disclosure and its features and advantages, reference is now made to the following description, taken in conjunction with the accompanying drawings, in which:

FIGS. 6A and 6B illustrate an alternative example operation of a system configured to reconfigure a network.

DESCRIPTION OF EXAMPLE EMBODIMENTS

The present disclosure relates to systems and methods of reconfiguring a network. A group of demands may be collected, each of which has a possible resource release by rerouting from its current path to a new path. A subgroup of those demands may be selected to provide the highest resource release while avoiding resource contention. The subgroup of demands may then be rerouted before releasing their previous paths such that none of the demands are interrupted. After the rerouting has occurred, then the resources no longer needed may be released. The process may then be iteratively repeated to free additional resources until no rerouting may occur to free additional resources.

Figure 1:
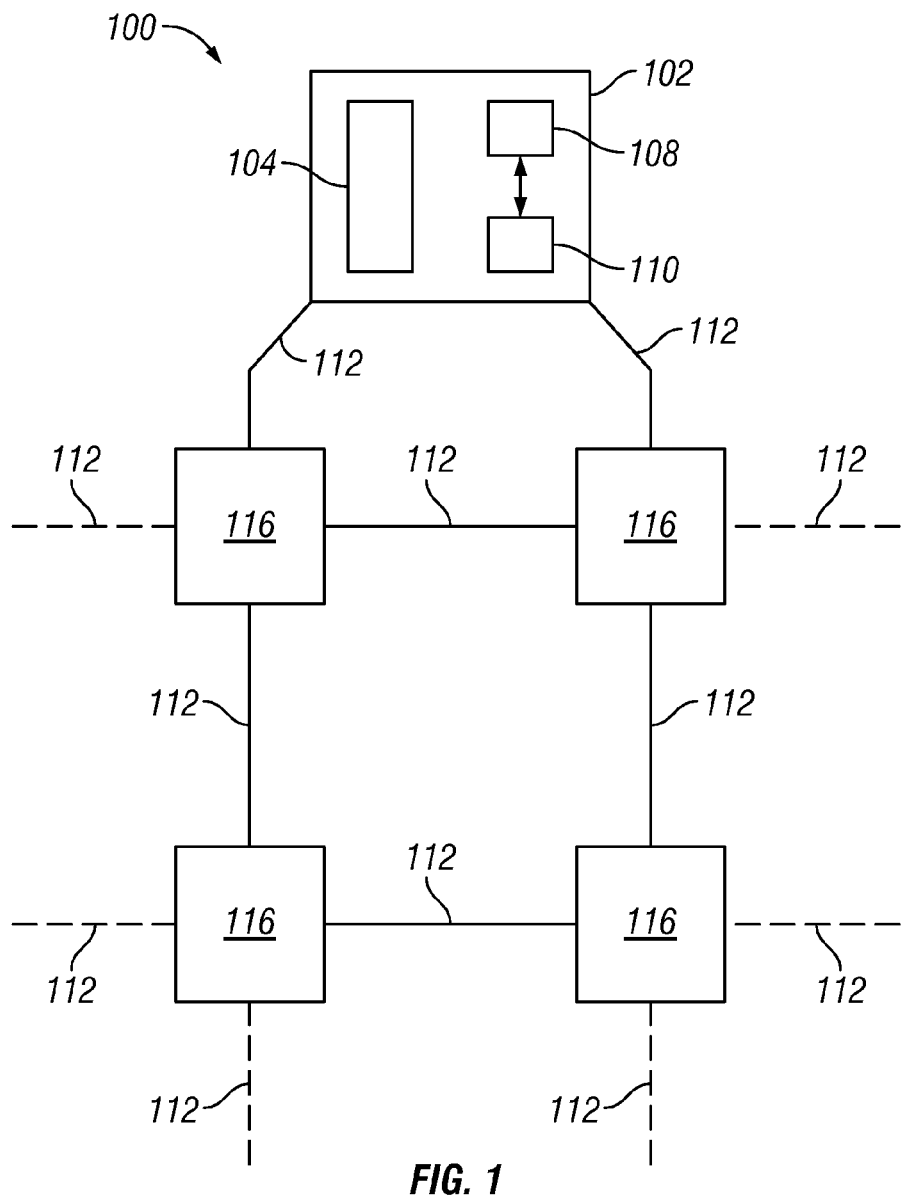
FIG. 1 illustrates an example embodiment of a system configured to reconfigure a network.

FIG. 1 illustrates an example embodiment of a system configured to reconfigure a network. System 100 may include a network management system (NMS) 102 configured to reconfigure a network. NMS 102 may be configured to produce such reconfiguration in relation to other elements in communication with NMS 102, such as nodes 116. NMS 102 and nodes 116 may be communicatively coupled in any suitable manner, such as through a network, such as an optical network, mesh network, wide-area-network, local-area-network, an intranet, the Internet, or any combination thereof. In some embodiments, NMS 102 may be in communication with nodes 116 over a management or control plane. For example, NMS 102 may be communicatively coupled with nodes 116 via one means for the management plane and the nodes 116 may be in communication with each other via another means in a data plane, or they may be communicatively coupled by the same means for both the management and the data planes. NMS 102 may control access to links 112 and/or a particular node 116, which may include one or more available resources that may be assigned to demands of nodes 116. For example, communication from a first node 116 to a second node may traverse a third node to facilitate the communication.

Resources may include, for example, any suitable division of bandwidth, capacity, storage, optical lines, light paths, wavelength channels, computing resources, processor capacity, nodes, routers, ports, switches, or combinations thereof. Resources may be assigned to any suitable communication connection according to the protocols or services used by system 100. NMS 102 may control access of network link 112 for nodes 116, such that use of network link 112 by nodes 116 may be determined by routes and assignments, or paths, created by NMS 102.

System 100 may communicate information or "traffic" over links 112. As used herein, "traffic" means information transmitted, stored, or sorted in system 100. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in system 100 may be structured in any appropriate manner including, but not limited to, being structured in frames, packets, or an unstructured bit stream.

NMS 102 may be implemented in any suitable manner, such as by a computer, server, mobile device, router, blade, cloud computing device, embedded computer, control plane, or board. NMS 102 may include a processor 108 communicatively coupled to a memory 110.

Nodes 116 may include, for example, producers or consumers of information that is to traverse links 112. Nodes 116 may have demands or needs of specific aspects of links 112 or other nodes 116. Nodes 116 may also include, for example, any suitable system operable to transmit and receive traffic. In the illustrated embodiment, each node 116 may be operable to transmit traffic directly to one or more other nodes 116 and receive traffic directly from one or more other nodes 116. Nodes 116 may further be in communication with other nodes indirectly via any combination of nodes and links 112. Link 112 may include any system, device, or apparatus configured to communicatively couple nodes 116 to each other and communicate information between corresponding nodes 116. For example, link 112 may include an optical fiber, an Ethernet cable, a copper cable, a twisted pair cable, a T1 cable, a WiFi signal, a Bluetooth signal, or other suitable medium.

Although system 100 is illustrated with a certain configuration, system 100 and NMS 102 may be configured to control any suitable number or kind of links 112, nodes 116, and combinations thereof.

NMS 102 may include a path computation engine 104. Path computation engine 104 may be configured to determine, given demands from nodes 116 and available capacity on network link 112, what access will be given to various nodes 116 and how such access will be made. The determination of how access may be made may include a route through various intermediate network devices or paths that will be taken for a demand of network node 116. Path computation engine 104 may be configured to reroute access to network link 112. Rerouting may be performed to better utilize the resources of system 100. Better utilization may be accomplished by, for example, minimizing resource usage to better accommodate additional traffic or to minimize conflicting demands that may block each other. Rerouting may be made upon, for example, a reconfiguration of the network topology of system 100, upon failure of an element within the network of system 100, changing network traffic, at predefined instances in time or after the elapse of defined time periods, conflict in demands for network resources, reaching a threshold of network demands that are non-optimal, or reaching threshold performance metrics. Rerouting may include, for example, calculation of new paths by which nodes 116 may utilize network resources.

Path computation engine 104 may be implemented in any suitable manner. For example, path computation engine 104 may be implemented by hardware, software, or any suitable combination thereof. Path computation engine 104 may include instructions resident in memory 110 that, upon execution by processor 108, cause the operation as described in conjunction with path computation engine 104.

Processor 108 may comprise, for example a microprocessor, microcontroller, digital signal processor (DSP), application specific integrated circuit (ASIC), field-programmable gate array (FPGA), or any other digital or analog circuitry configured to interpret and/or execute program instructions and/or process data. In some embodiments, processor 108 may interpret and/or execute program instructions and/or process data stored in memory 110 to carry out some or all of the operation of NMS 102. Memory 110 may be configured in part or whole as application memory, system memory, or both. Memory 110 may include any system, device, or apparatus configured to hold and/or house one or more memory modules. Each memory module may include any system, device or apparatus configured to retain program instructions and/or data for a period of time (e.g., computer-readable media). Memory 110 may be non-transitory. One or more portions or functionality NMS 102 may be implemented by the execution of instructions resident within memory 110 by processor 108.

Figure 2:
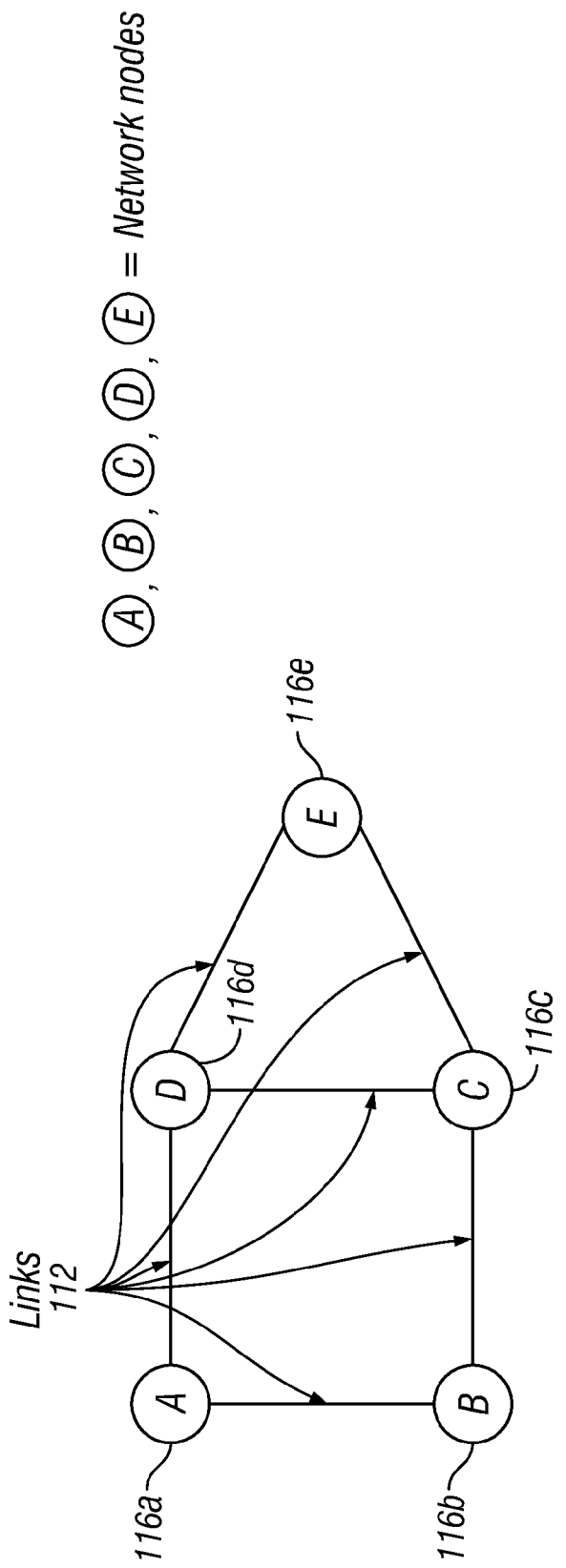
FIG. 2 illustrates an example embodiment of a system of network links to be reconfigured.

FIGS. 2-4G serve to illustrate some embodiments of the present disclosure. FIG. 2 illustrates an example embodiment of a system of links to be reconfigured. FIGS. 3A-3G illustrate various stages of progression through one embodiment of the present disclosure, and FIGS. 4A-4G illustrate various stages of progression through an alternative embodiment of the present disclosure.

As shown in FIG. 2, circles A, B, C, D, and E represent nodes 116*a-e* and the lines between them represent links 112. For illustrative purposes, five nodes are depicted and the links have a capacity of two demands. For example, the links may be 10 G links along fiber-optic cables with the capacity to carry a finite number of optical wavelengths. It will be appreciated that any number and variety of nodes, links, and demands may be used. In particular embodiments, the number of nodes and links may be very large, the network covering an entire city, state, region, or country, for example. For convenience in understanding FIGS. 2-4G, the term "unit" may be used to refer to capacity of a link. This may include any feature which may limit the capacity of nodes 116 and/or links 112 to convey information, and may be related to resources as described herein. For example, units may be determined by optical bandwidth, processing limitations, or any of the other resources described herein. For convenience and for exemplary purposes herein, each link 112 may be described as having a capacity of eight units, and each demand requiring four units. It will be appreciated that any combination or designation of capacity and demand requirement may be used. For example, capacity could be designated as ten units and a first demand might require three units and a second demand might require five units. However, to facilitate understanding, the designations described above will be used.

Figure 3B:
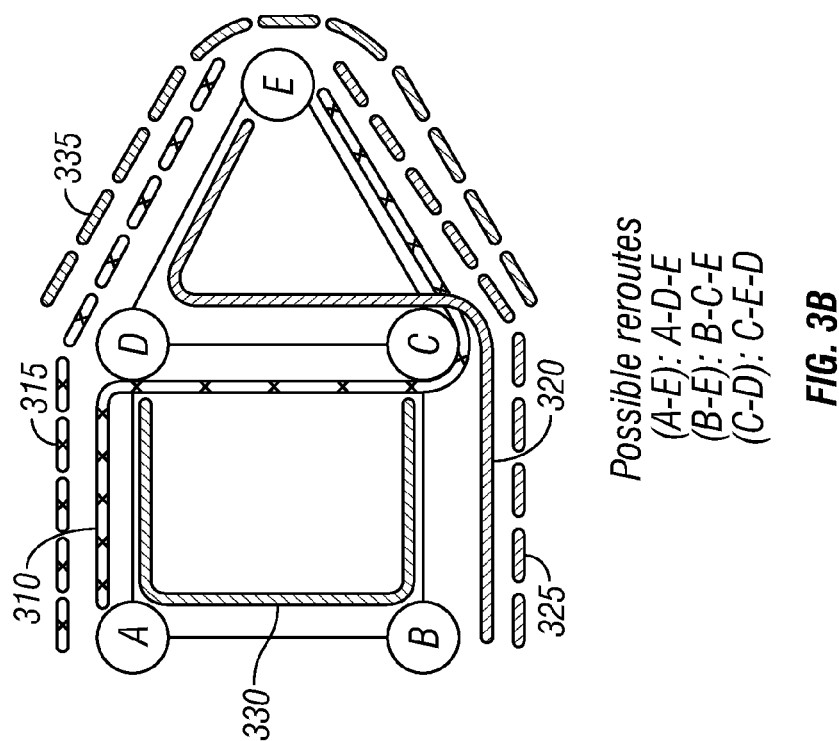
FIG. 3B illustrates an example embodiment of a system of network links and possible reroutes.
Figure 3A:
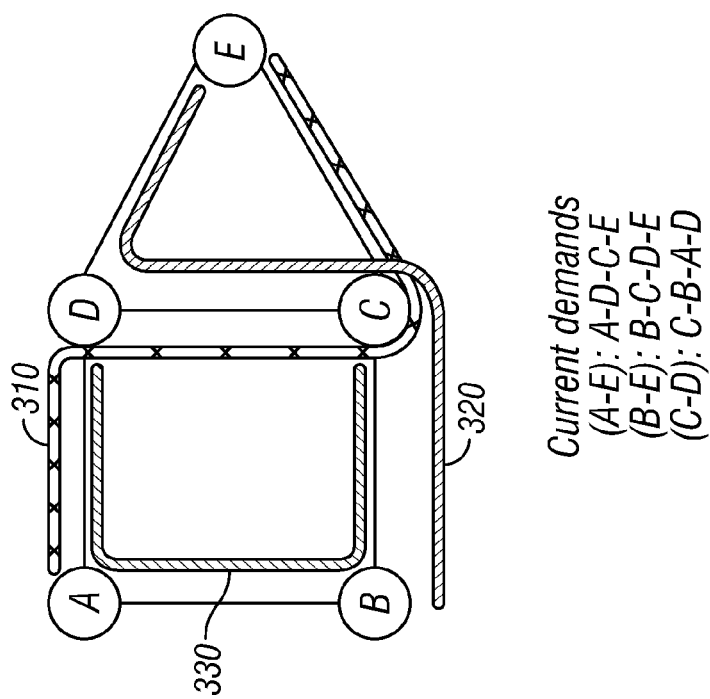
FIG. 3A illustrates an example embodiment of a system of network links and current demands.

FIGS. 3A-3G illustrate an example embodiment of the present disclosure in which demands are rerouted along paths based on the shortest available path for the demand being rerouted. FIG. 3A illustrates an example embodiment of a system of links and current demands and their associated paths. As shown in FIG. 3A, three current demands are shown. As described previously, for purposes of illustration, the demands require four of the eight units of each link. A first demand 310 connecting node A to node E traverses the link from A to D, then from D to C, and then from C to E. A second demand 320 connecting node B to node E traverse the link from B to C, then from C to D, then from D to E. A third demand 330 connecting node C to node D traverses the link from C to B, then from B to A, and then from A to D. As shown in FIG. 3A, each of the links connecting A to D, B to C, and D to C have two demands. Thus, there are no available resources on these links. The links connecting A to B, D to E, and E to C have available resources. As can be seen from FIG. 3A, some of the demand paths are not in an ideal configuration. For example, each of demands 310, 320, and 330 have shorter available paths. By using these shorter paths, the resources being used by these non-ideal configurations could be released. Thus, by reconfiguring the network, resources may be used more efficiently. This may be accomplished by rerouting demand pathways.

In some embodiments, a set of demands that may be rerouted to release resources may be collected. This may be referred to as the PossRerouted set. For each demand, this may be determined based on the combination of available resources and the demand's current path. In some embodiments, this may create overlapping possibilities of demand rerouting. For example, if two potential reroutes would both need to use the same available resources in their new paths, those two potential reroutes would have a resource conflict or resource contention. PossRerouted may be collected based on the shortest available path, the shortest path, or combinations thereof.

FIG. 3B illustrates an example embodiment of a system of network links and possible reroutes of demands traversing those links. First demand 310 may be rerouted to a first new path 315. First new path 315 may employ the link from A to D because first demand 310 currently traverses that path, even though all of the resources of that particular link are being used. First new path 315 may be rerouted to traverse the link from D to E because that link has available resources for one additional demand path. First new path 315 would effectively free the resources from D to C and C to E while using the available resources D to E. The net resource release would be four units.

Second demand 320 may be rerouted to a second new path 325. Second new path 325 may employ the link from B to C because second demand 320 currently traverses that path, even though all of the resources of that particular link are being used. Second new path 325 may be rerouted to traverse the link from C to E because that link has available resources for one additional demand path. Second new path 325 would effectively free the resources from C to D and D to E while using the available resources C to E. The net resource release would be four units.

Third demand 330 may also be rerouted to a third new path 335. Third new path 335 may employ the available resources for the links from C to E and from E to D. Third new path 335 would effectively free the resources from C to B, B to A, and A to D while using the available resources C to E and E to D. The net resource release would be four units.

While links between nodes and units of those links are used above for illustrative purposes, it will be appreciated that these examples are in no way limiting. Rather, a resource release may be associated with making available any of the resources described herein.

According to certain embodiments of the present disclosure, once the complete set of demands with possible reroutes is collected (PossRerouted), a subset of that set is then selected to actually be rerouted. This set may be referred to as Rerouted. This subset may be selected based on acquiring the highest resource release. In some embodiments, the selection of Rerouted may occur iteratively. For example, the demand with the highest resource release may be selected first, and the resources associated with rerouting that demand may be reserved. The demand with the next highest resource release may then be selected, and a determination made as to whether the resources required to reroute the next-highest demand would require the resources already reserved by rerouting the highest resource release, or in other words, if the next-highest demand would have a resource contention with the reserved resources. If the next highest resource release would have a resource contention, then it may not be included in the set Rerouted. This process may then be repeated for each of the demands in PossRerouted. In some embodiments, reserving the resources may include actually forming the connections to reroute the demand with the highest resource release. In such an embodiment, resource contentions may involve resources already being used by the already rerouted demands.

Using the example illustrated in FIG. 3B, each of the potential reroutes release the same number of resources. However, because the current connections are maintained while new connections are made (which may be referred to as "make-before-break" or bridge and roll), third new path 335 conflicts with first and second new paths 315 and 325. Thus, the two potential sets for Rerouted are {first demand 310, second demand 320} with a net resource release of eight units, and {third demand 330} with a net resource release of four units. Therefore, in the example shown, the set Rerouted corresponds to new paths 315 and 325.

Figure 3D:
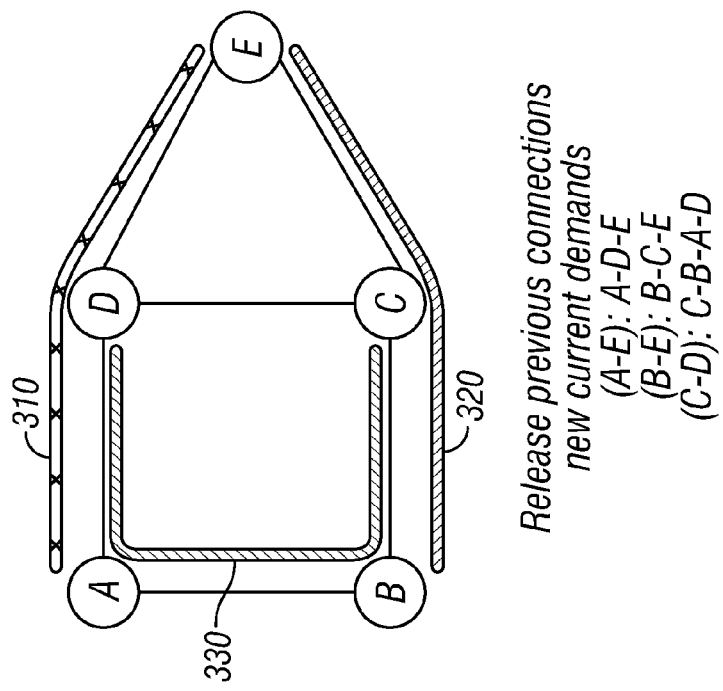
FIG. 3D illustrates an example embodiment of a system of network links after previous connections are released.
Figure 3C:
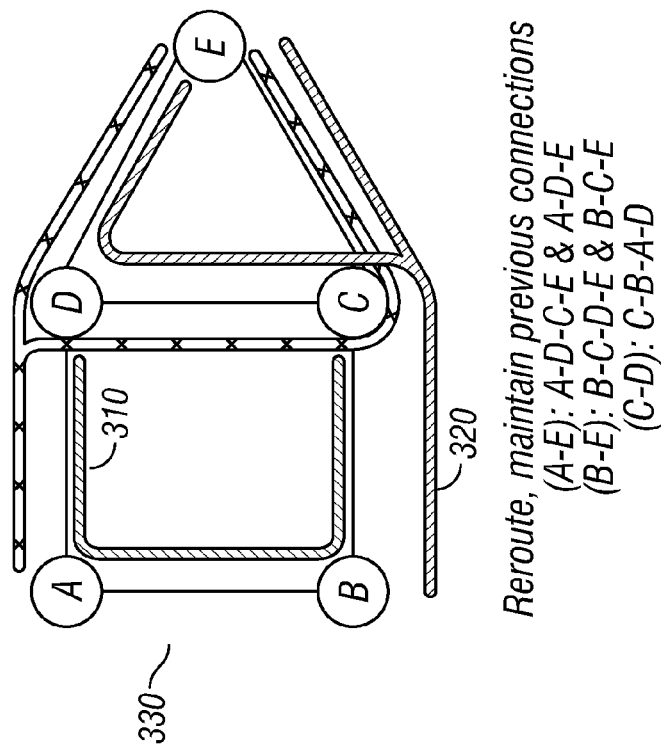
FIG. 3C illustrates an example embodiment of a system of network links after being rerouted.

As shown in FIG. 3C, once subgroup Rerouted is selected from PossRerouted, the new connections may be made. As described above, this may be done such that previous connections are maintained while new connections are made up so that each demand may be met and maintained while network resource usage is optimized. As shown in FIG. 3D, after the connections have been made, the resources may be released. Thus, a new current demand usage with routing paths among the nodes is established. However, further network resource optimization may be accomplished, so the process is sent through another iteration of rerouting demand paths.

Figure 3F:
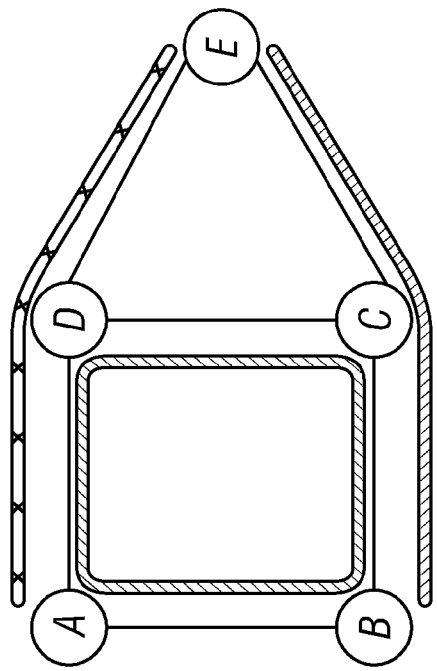
FIG. 3F illustrates an example embodiment of a system of network links after being rerouted.
Figure 3E:
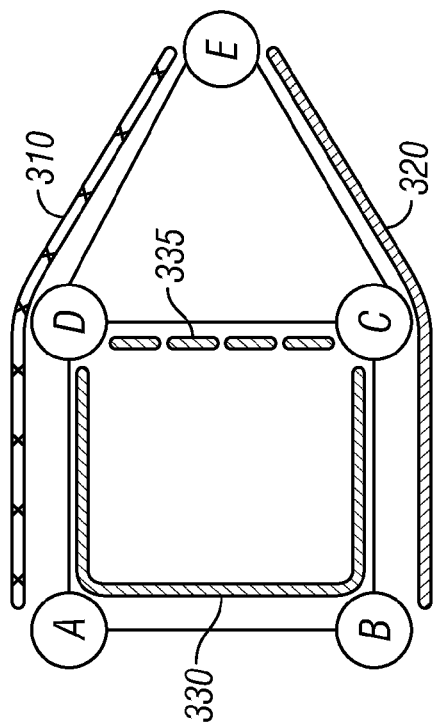
FIG. 3E illustrates an example embodiment of a system of network links and possible reroutes.

FIG. 3E illustrates an example embodiment of a system of network links and possible reroutes during a second iteration. At the beginning of the second iteration, sets PossRerouted and Rerouted may be emptied. First demand 310 is already in its shortest path so no resources are released by rerouting first demand 310. The same is true for second demand 320. However, third demand 330 may be rerouted to release resources. In the example shown in FIG. 3E, third demand 330 may be rerouted to new path 335. This would release the resources between nodes C and D, B and A, and A and D, while using the available resources between nodes C and D. The net resource release would be eight units. Thus, the set PossRerouted only contains {third demand 330}. Further, the subset Rerouted is the same, containing {third demand 330} corresponding to third new path 335.

Figure 3G:
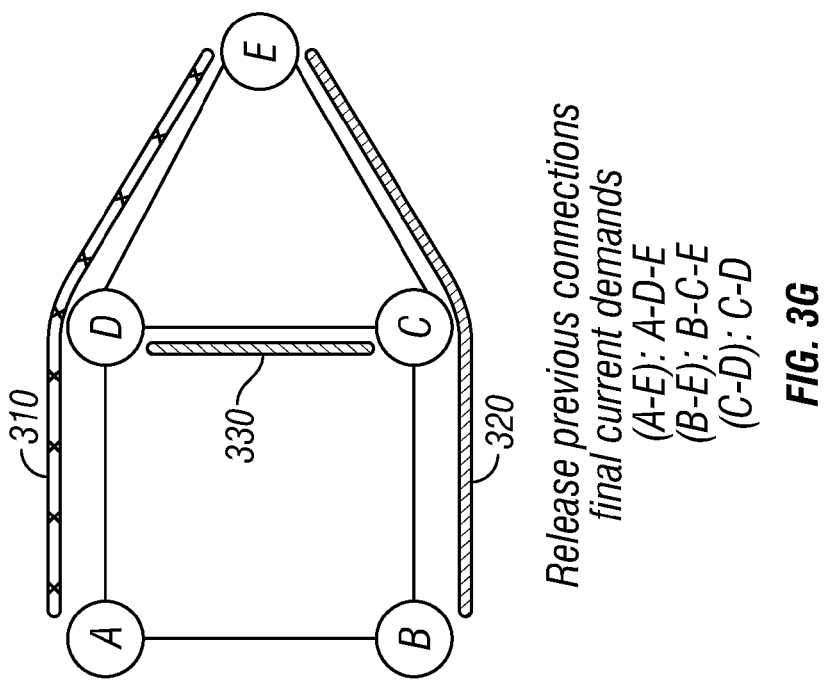
FIG. 3G illustrates an example embodiment of a system of network links after previous connections are released.

As shown in FIG. 3F, the new connections of the set Rerouted are made while the previous connections are maintained. As shown in FIG. 3G, after the new connections are made, the previous connections are released. By using this iterative process it may be observed that resources may be optimized with minimal computation complexity while maintaining each of the demands. Additionally, by maintaining initial connections while new connections are made, resource dependency among demands may be avoided.

The present disclosure contemplates variations in the collecting of demands to create the set PossRerouted. In some embodiments, the set PossRerouted may be limited to demands whose new path is only the shortest path. In other embodiments, PossRerouted may be limited to demands whose new path is only the shortest available path. In still other embodiments, PossRerouted may be either the shortest path or the shortest available path. For example, one set of iterations may collect demands based on the shortest path and then a later set of iterations may do so based on the shortest available path.

The present disclosure also contemplates variations in the selection of the subset of demands of PossRerouted to create the set of Rerouted. In one embodiment, Rerouted may be selected by iteratively selecting the demands with the highest resource release until there are no demands that are able to reroute to their new paths. In alternative embodiments, Rerouted may be limited to a small number of demands, for example, one to three demands. Limiting Rerouted to a small number of demands may release resources more frequently. However, this also causes the collection of PossRerouted to occur more frequently as the reconfiguring progresses through additional iterations. The limiting number for Rerouted may be selected to balance between frequency of releasing resources and frequency of collecting PossRerouted based on available resources. Additionally, the limiting number may change over the number of iterations the reconfiguring has gone through. For example, the first iteration may limit Rerouted to three demands, the second iteration may limit Rerouted to five demands, and so forth.

FIGS. 4A-4G illustrate an alternative example embodiment of a system of network links to be reconfigured similar to FIGS. 3A-3G. However, FIGS. 4A-4G illustrate an embodiment where PossRerouted is limited to the shortest path.

Figure 4B:
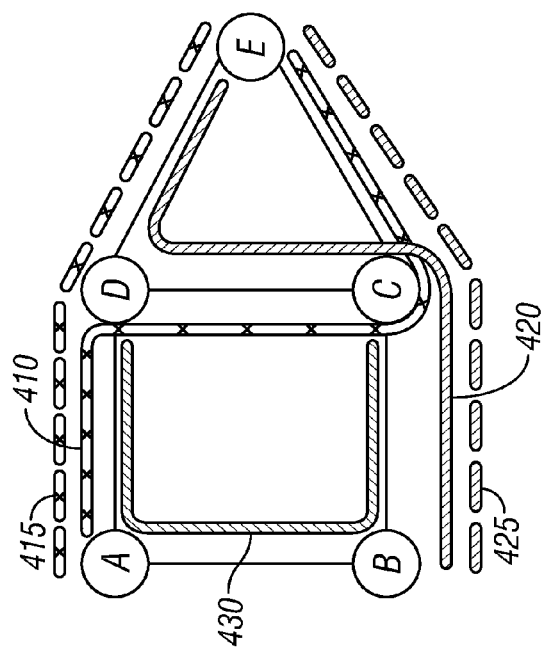
FIG. 4B illustrates an alternative example embodiment of a system of network links and possible reroutes.
Figure 4A:
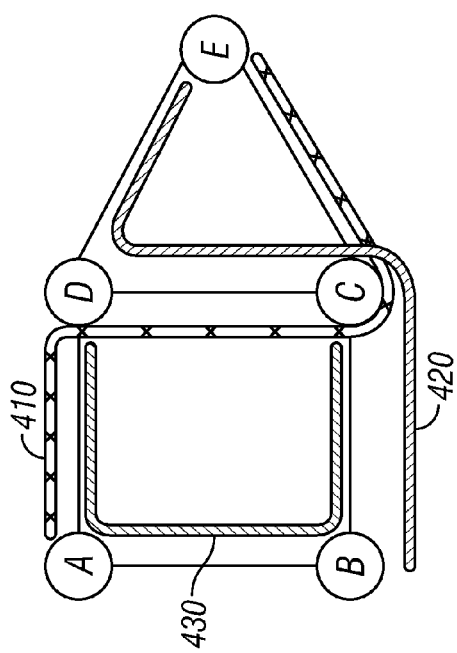
FIG. 4A illustrates an alternative example embodiment of a system of network links and current demands.

As shown in FIG. 4A, three current demands are shown. As described previously, for purposes of illustration, the demands require four of the eight units of each link. A first demand 410 connecting node A to node E traverses the link from A to D, then from D to C, and then from C to E. A second demand 420 connecting node B to node E traverse the link from B to C, then from C to D, then from D to E. A third demand 430 connecting node C to node D traverses the link from C to B, then from B to A, and then from A to D. As shown in FIG. 4A, each of the links connecting A to D, B to C, and D to C have two demands. Thus, there are no available resources on these links. The links connecting A to B, D to E, and E to C have available resources.

FIG. 4B illustrates an alternative example embodiment of a system of network links and possible reroutes of demands traversing those links based on the shortest path. First demand 410 may be rerouted to a first new path 415 representing the shortest path from A to E. First new path 415 may employ the link from A to D because first demand 410 currently traverses that path, even though all of the resources of that particular link are being used. First new path 415 may be rerouted to traverse the link from D to E because that link has available resources for one additional demand path. First new path 415 would effectively free the resources from D to C and C to E while using the available resources D to E. The net resource release would be four units.

Second demand 420 may be rerouted to a second new path 425 representing the shortest path from B to E. Second new path 425 may employ the link from B to C because second demand 420 currently traverses that path, even though all of the resources of that particular link are being used. Second new path 425 may be rerouted to traverse the link from C to E because that link has available resources for one additional demand path. Second new path 425 would effectively free the resources from C to D and D to E while using the available resources C to E. The net resource release would be the 4 units between C and D.

Third demand 430 does not have a possible reroute because the shortest path from C to D is unavailable because first demand 410 and second demand 420 are already utilizing all of the resources along the link from C to D. Thus, third demand 430 may not be included in PossRerouted. In the example shown in FIG. 4B, the set PossRerouted is {first demand 410, second demand 420}.

According to certain embodiments of the present disclosure, once PossRerouted is collected, Rerouted is then selected to actually be rerouted. This subset may be selected based on acquiring the highest resource release. In this example, Rerouted may be the same set as PossRerouted because first new path 415 and second new path 425 do not cause a resource conflict and produce the maximum resource release.

Figure 4C:
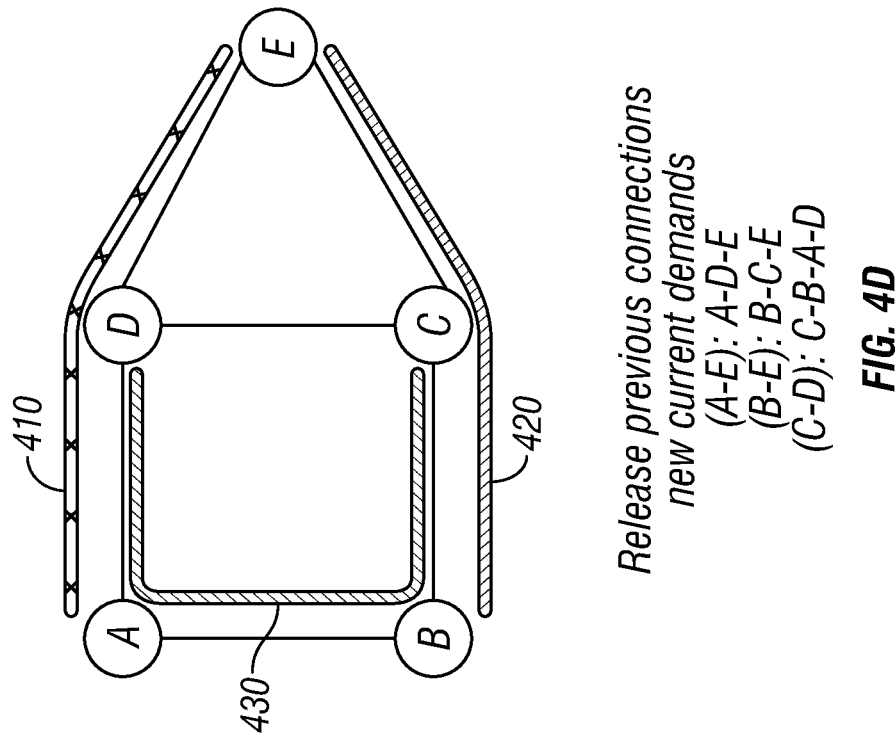
FIG. 4C illustrates an alternative example embodiment of a system of network links after being rerouted.
Figure 4D:
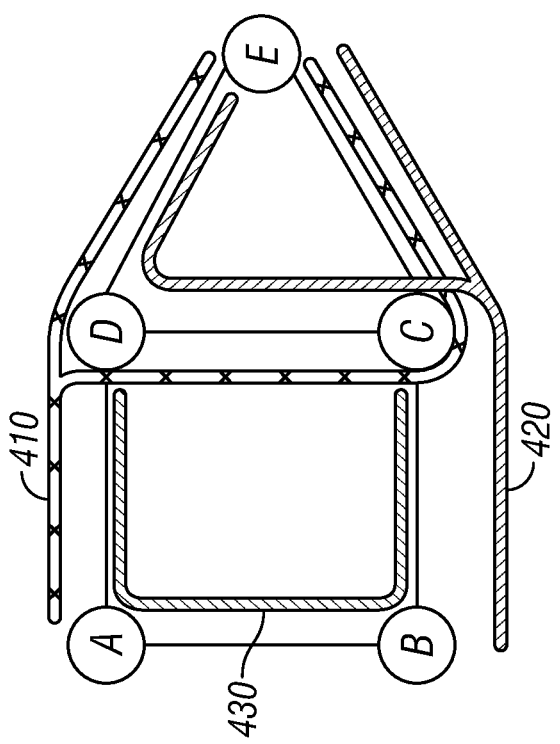
FIG. 4D illustrates an alternative example embodiment of a system of network links after previous connections are released.

As shown in FIG. 4C, once subgroup Rerouted is selected from PossRerouted, the new connections may be made. As described above, this may be done such that previous connections are maintained while the new connections are made up so that each demand may be met and maintained while network resource usage is optimized. As shown in FIG. 4D, after the connections have been made, the resources may be released. Thus, a new current demand usage with routing paths among the nodes may be established. However, further network resource optimization may be accomplished, so the process may be sent through another iteration of rerouting demand paths.

Figure 4F:
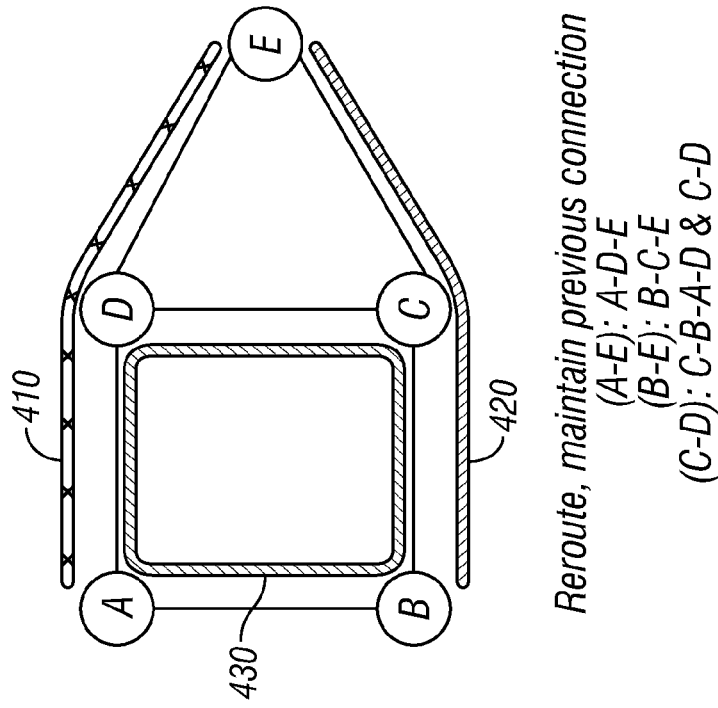
FIG. 4F illustrates an alternative example embodiment of a system of network links after being rerouted.
Figure 4E:
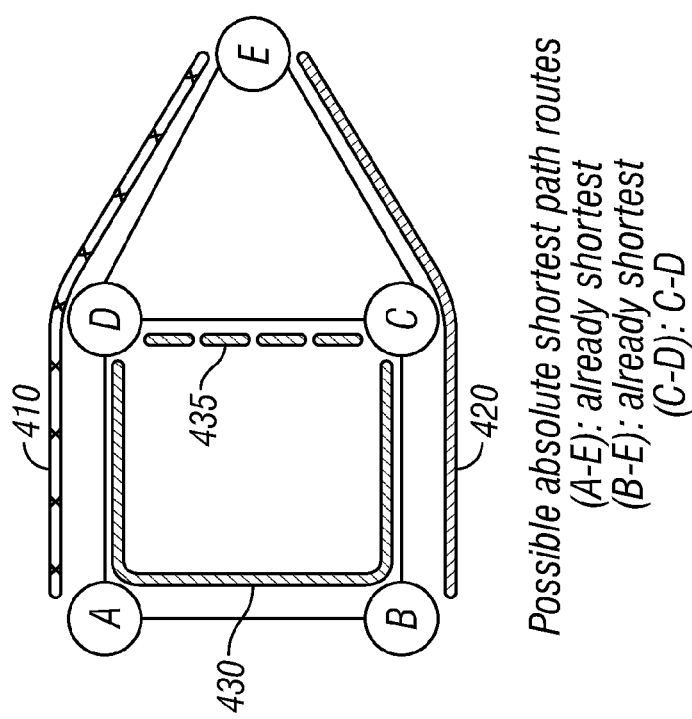
FIG. 4E illustrates an alternative example embodiment of a system of network links and possible reroutes.

FIG. 4E illustrates an example embodiment of a system of network links and possible reroutes during a second iteration. At the beginning of the second iteration, sets PossRerouted and Rerouted may be emptied. First demand 410 and second demand 420 are already in their shortest paths. However, third demand 430 may be rerouted to release resources. In the example shown in FIG. 3E, third demand 430 may be rerouted to new path 435 representing the shortest path between C and D. This would release the resources between nodes C and D, B and A, and A and D, while using the available resources between nodes C and D. The net resource release would be eight units. Thus, the set PossRerouted only contains {third demand 430}. Further, the subset Rerouted is the same, containing {third demand 430} with corresponding new path 435.

Figure 4G:
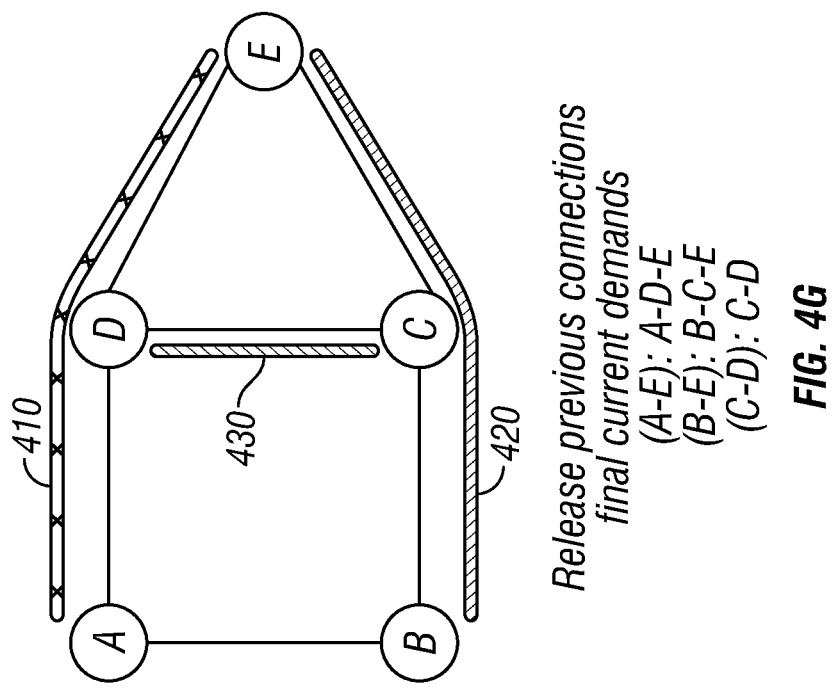
FIG. 4G illustrates an alternative example embodiment of a system of network links after previous connections are released.

As shown in FIG. 4F, the new connections of the set Rerouted are made while the previous connections are maintained. As shown in FIG. 4G, after the new connections are made, the previous connections are released.

While the same final result may be obtained in the embodiments shown in FIGS. 3A-3G and 4A-4G, it will be appreciated that different embodiments were used to reconfigure the network resources. For example, for FIGS. 3A-3G, the set PossRerouted for the first iteration contained {first demand 310, second demand 320, third demand 330} while PossRerouted for the first iteration of FIGS. 4A-4G contained {first demand 410, second demand 420}.

Figure 5:
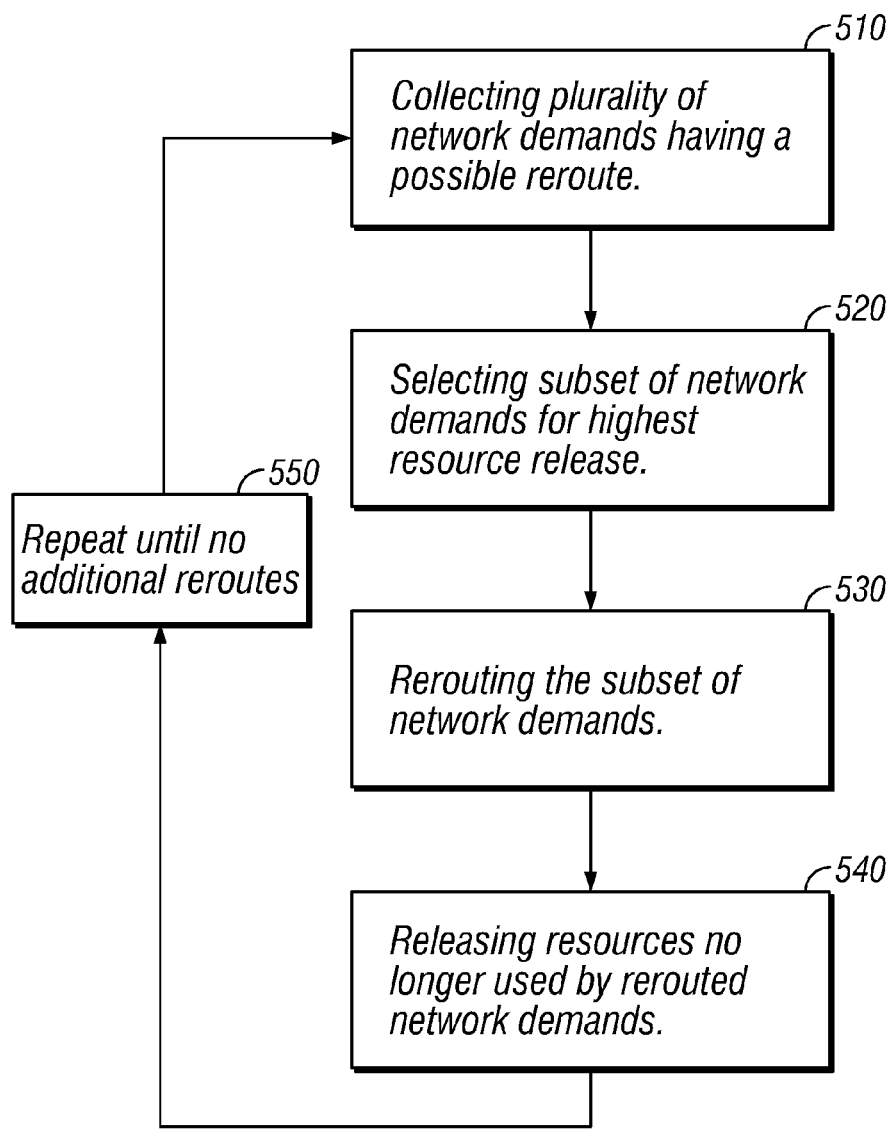
FIG. 5 illustrates an example operation of a system configured to reconfigure a network.

FIG. 5 illustrates an example operation of a system configured to reconfigure a network. Operation 510 includes collecting a plurality of network demands having a possible reroute that releases resources. These demands may be collected into a set PossibleReroutes. Operation 520 includes selecting a subset of network demands that correspond with the highest resource release without a resource conflict. This selection may be a set Reroutes. Operation 530 includes rerouting the subset of network demands that were selected in operation 520. For example, each of the demands in set Reroutes may be routed at operation 530. Operation 540 includes releasing resources no longer used by the network demands rerouted at operation 530. As shown by operation 550, these operations may then be repeated to release additional resources based on new paths utilizing the newly released resources. In some embodiments, they are repeated until no new reroutes would release resources, or in other words, until the set PossibleReroutes is empty.

Figure 6B:
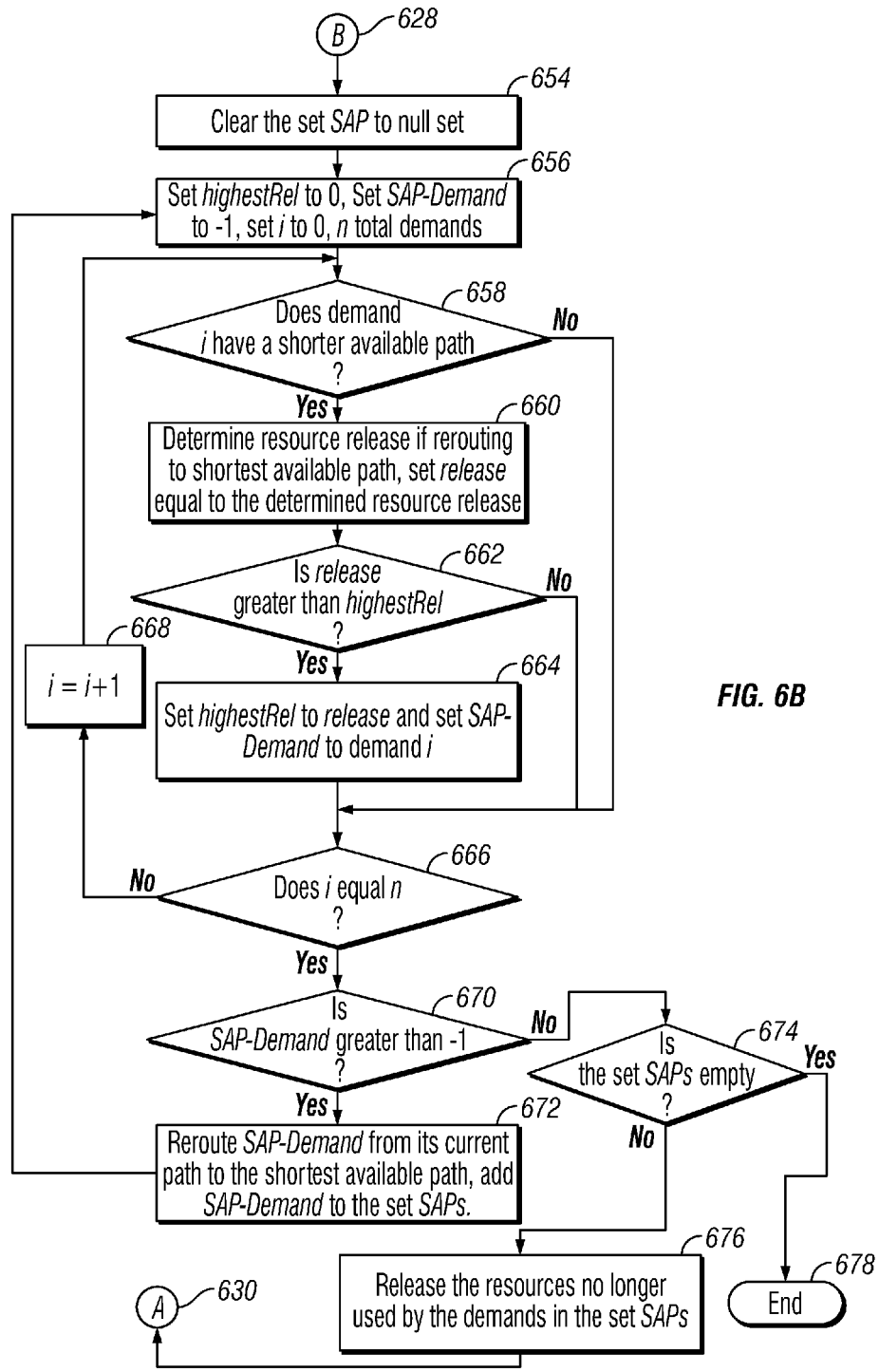

FIGS. 6A and 6B illustrate an alternative example operation of a system configured to reconfigure a network in which both the shortest path and the shortest available path are used. First, the operation may reconfigure demands to their shortest path, and then reconfigure demands to their shortest available path. The first portion, shown in FIG. 6A, may be referred to as the shortest path portion. The second portion, shown in FIG. 6B, may be referred to as the shortest available path portion. It will be appreciated that while shown working together in FIGS. 6A and 6B, each portion may operate independently. Further, it will be appreciated that the order of the two portions may be modified, or the looping within the two portions may be modified to change when the overall process goes through each portion.

Variables may be used with reference to FIGS. 6A and 6B to facilitate understanding of the present disclosure; however, it will be appreciated that these are merely illustrative and are in no way limiting. For example, the variables SPs (representing a set of demands with the shortest paths and highest resource releases, which may correspond to the set Reroutes), highestRel (representing the current highest resource release by rerouting a demand), release (representing the resource release of the currently analyzed demand), SP-Demand (representing the demand with the highest release based on shortest path), i (used to iteratively go through all the demands), n (used to represent the total number of demands), SAPs (representing a set of demands with the shortest available paths and the highest resource releases, which may correspond to the set Reroutes), and SAP-Demand (representing the demand with the highest release based on shortest available path) may be used.

With reference to FIG. 6A, at operation 602 the reconfiguration may start. At operation 604, the set SP may be initialized to be empty, the null set, or SP={ }. At operation 606, other variables may be initialized, including highestRel, SP-Demand, i, and n. At operation 608, a determination may be made as to whether Demand i has its shortest path available. If the shortest path is not available, the process may proceed to operation 616. If it is available, the process may proceed to operation 610. At operation 610, the resource release may be determined for rerouting Demand i to its shortest path. The variable release may be set to equal the determined resource release. At operation 612, a determination may be made as to whether release is greater than highestRel. If release is not greater than highestRel, then the operation may proceed to operation 616. If release is greater than highestRel, then the process may proceed to operation 614. At operation 614, highestRel may be changed to the value of release and the value of SP-Demand may be changed to Demand i. At operation 616, a determination may be made as to whether i equals n, or in other words, if all of the n demands have been analyzed. If all the demands have been analyzed, or i equals n, the process may proceed to operation 620. If i does not equal n, then the process may proceed to operation 618 where i may be increased by one before continuing back to operation 608 to analyze the next demand.

At operation 620, a determination may be made as to whether SP-Demand is greater than −1, or in other words, a determination may be made whether any demands were found with a shortest path resource release reroute available. If SP-Demand is greater than −1, then the process may proceed to operation 622. At operation 622, SP-Demand may be rerouted from its current path to its shortest path. This may occur without releasing the resources of the current path of SP-Demand. Once the new connections are made, SP-Demand may be added to the set SPs. The process may then proceed back to operation 606 to determine if any additional shortest paths with an associated resource release may be available. If SP-Demand is not greater than −1, then the process may proceed to operation 624.

At operation 624, a determination may be made as to whether the set SPs is empty, or in other words, if there are any shortest paths that have had new connections made but still have resources to be released. If SPs is not empty, the process may proceed to operation 626 where the resources no longer used by the demands in SPs may be released, at which point the process may proceed to operation 604 to determine if any additional shortest paths may be available with the additionally released resources. If SPs is empty, the process proceeds to operation 628, designated by letter B.

With reference to FIG. 6B, the process proceeds from operation 628. FIG. 6B is similar to FIG. 6A, however, the process may be based on shortest available paths, rather than shortest paths. At operation 654, the set SAP may be initialized to be empty, the null set, or SAP={ }. At operation 656, other variables may be initialized, including highestRel, SAP-Demand, i, and n. At operation 658, a determination may be made as to whether Demand i has any shorter path available. If a shorter path is not available, the process may proceed to operation 666. If a shorter path is available, the process may proceed to operation 660. At operation 660, the resource release may be determined for rerouting Demand i to the shorter available path. The variable release may be set to equal the determined resource release. At operation 662, a determination may be made as to whether release is greater than highestRel. If release is not greater than highestRel, then the operation may proceed to operation 666. If release is greater than highestRel, then the process may proceed to operation 664. At operation 664, highestRel may be changed to the value of release and the value of SAP-Demand may be changed to Demand i. At operation 666, a determination may be made as to whether i equals n, or in other words, if all of the n demands have been analyzed. If all the demands have been analyzed, or i equals n, the process may proceed to operation 670. If i does not equal n, then the process may proceed to operation 668 where i may be increased by one before continuing back to operation 658 to analyze the next demand.

At operation 670, a determination may be made as to whether SAP-Demand is greater than −1, or in other words, a determination may be made whether any demands were found with a shorter available path whose reroute would release resources. If SAP-Demand is greater than −1, then the process may proceed to operation 672. At operation 672, SAP-Demand may be rerouted from its current path to the shortest available path. This may occur without releasing the resources of the current path of SAP-Demand. Once the new connections are made, SAP-Demand may be added to the set SAPs. The process may then proceed back to operation 656 to determine if any additional shortest available paths with an associated resource release may be available. If SAP-Demand is not greater than −1, then the process may proceed to operation 674.

At operation 674, a determination may be made as to whether the set SAPs is empty, or in other words, if there are any shorter available paths that have had new connections made but still have resources to be released. If SAPs is not empty, the process may proceed to operation 676 where the resources no longer used by the demands in SAPs may be released, at which point the process may proceed to operation 656 to determine if any additional shortest available paths may be available with the newly released resources. If SAPs is empty, the process proceeds to operation 678, where it ends. If SAPs is not empty, the process proceeds to operation 630, designated by letter A. Operation 630 feeds back into FIG. 6A to operation 604. In other words, once additional resources have been released by the shortest available path process, the overall process may proceed to determine if any shortest paths were made available before proceeding back to the shortest available path process.

As described above, it may be possible to modify the operations observed in FIGS. 6A and 6B to limit the size of the set of reroutes. For example, in FIG. 6A, the size of SPs may be limited to a small number (for example, one) such that after the rerouting of operation 622, the process would proceed to operation 626 rather than proceeding back to operation 606. If a larger number than one were used, the process may proceed until the size of SPs matched that number, and then it might proceed to operation 626 rather than rerouting back to operation 606. The same may be true for FIG. 6B. For example, the size of SAPs may be limited to a small number. For example, if it is limited to one, the process may proceed from operation 672 to operation 676, rather than routing back to operation 656. If it is larger than one, the process may continue looping until the size of SAPs matches the limiting size, and then the process may proceed to operation 676, rather than looping back until all possible reroutes have been accounted for.

Herein, "or" is inclusive and not exclusive, unless expressly indicated otherwise or indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, "A and B" means "A and B, jointly or severally," unless expressly indicated otherwise or indicated otherwise by context.

Particular embodiments may be implemented as hardware, software, or a combination of hardware and software. As an example and not by way of limitation, one or more computer systems may execute particular logic or software to perform one or more steps of one or more processes described or illustrated herein. Software implementing particular embodiments may be written in any suitable programming language (which may be procedural or object oriented) or combination of programming languages, where appropriate. In various embodiments, software may be stored in computer-readable storage media. Any suitable type of computer system (such as a single- or multiple-processor computer system) or systems may execute software implementing particular embodiments, where appropriate. A general-purpose computer system may execute software implementing particular embodiments, where appropriate. In certain embodiments, portions of logic may be transmitted and or received by a component during the implementation of one or more functions.

Herein, reference to a computer-readable storage medium encompasses one or more non-transitory, tangible, computer-readable storage medium possessing structures. As an example and not by way of limitation, a computer-readable storage medium may include a semiconductor-based or other integrated circuit (IC) (such as, for example, an FPGA or an application-specific IC (ASIC)), a hard disk, an HDD, a hybrid hard drive (HHD), an optical disc, an optical disc drive (ODD), a magneto-optical disc, a magneto-medium, a solid-state drive (SSD), a RAM-drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of a processor, one or more portions of a memory, or a combination of these, where appropriate. In particular embodiments, a computer-readable storage medium implements RAM or ROM. In particular embodiments, a computer-readable storage medium implements volatile or persistent memory.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, various embodiments may perform all, some, or none of the steps described above. Various embodiments may also perform the functions described in various orders.

Although the present invention has been described above in connection with several embodiments; changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A method of reconfiguring a network comprising:
    collecting a plurality of network demands, each of the plurality of network demands having a possible resource release by rerouting the network demand from its current path to a new path;
    selecting a subset of the plurality of network demands that, if rerouted, has the highest net resource release without resource contention by:
        iteratively picking one of the plurality of network demands with a maximum resource release; and
        reserving resources associated with the new path of the last picked network demand before a next iteration, wherein additional network demands are iteratively picked until no additional network demands may be rerouted to release resources;
    rerouting the subset of the plurality of network demands; and
    in response to rerouting the subset of the plurality of network demands, releasing resources no longer used by rerouted demands.

2. The method of claim 1, further comprising repeating the collecting, selecting, rerouting, and releasing operations until there are no network demands to collect with a possible resource release by rerouting the network demand.

3. The method of claim 1, wherein the subset of the plurality of network demands is limited to 1, 2, or 3 network demands.

4. The method of claim 1, wherein the new path is determined based on a shortest available path based on the network demand's current path and available resources or a shortest path.

5. The method of claim 4, wherein
    collecting a plurality of network demands is limited to the shortest path and comprises:
        determining whether a first demand's shortest path is available;
        based on a determination that the first demand's shortest path is available, calculating a resource release for rerouting the first demand to its shortest path;

determining whether a second demand's shortest path is available; and based on a determination that the second demand's shortest path is available, calculating a resource release for rerouting the second demand to its shortest path; and selecting a subset of the plurality of network demands comprises:

comparing the calculated resource release for rerouting the first demand and the calculated resource release for rerouting the second demand; and storing whichever of the first and second demands has a higher resource release in the subset of the plurality of network demands.

6. The method of claim 5, after releasing resources no longer used by rerouted demands based on the shortest path, repeating the collecting, selecting, rerouting, and releasing operations, wherein:

collecting a plurality of network demands is limited to the shortest available path and comprises:

determining whether a third demand has a shorter path available;

based on a determination that the third demand has a shorter path available, calculating a resource release for rerouting the third demand to its shorter path;

determining whether a fourth demand has a shorter path available; and based on a determination that the fourth demand has a shorter path available, calculating a resource release for rerouting the fourth demand to its shorter path; and selecting a subset of the plurality of network demands comprises:

comparing the calculated resource release for rerouting the third demand and the calculated resource release for rerouting the fourth demand; and storing whichever of the third and fourth demands has a higher resource release in the subset of the plurality of network demands.

7. A non-transitory computer-readable storage medium containing instructions, that when executed by a processor, are configured to:

collect a plurality of network demands, each of the plurality of network demands having a possible resource release by rerouting the network demand from its current path to a new path;

select a subset of the plurality of network demands that, if rerouted, has the highest net resource release without resource contention by:

iteratively picking one of the plurality of network demands with a maximum resource release; and reserving resources associated with the new path of the last picked network demand before a next iteration, wherein additional network demands are iteratively picked until no additional network demands may be rerouted to release resources;

reroute the subset of the plurality of network demands; and in response to rerouting the subset of the plurality of network demands, release resources no longer used by rerouted demands.

8. The non-transitory computer-readable storage medium of claim 7, further configure to repeat the collecting, selecting, rerouting, and releasing operations until there are no network demands to collect with a possible resource release by rerouting the network demand.

9. The non-transitory computer-readable storage medium of claim 7, wherein the new path is determined based on a shortest available path based on the network demand's current path and available resources or a shortest path.

10. The non-transitory computer-readable storage medium of claim 9, wherein:

collecting a plurality of network demands is limited to the shortest path and comprises:

determine whether a first demand's shortest path is available;

based on a determination that the first demand's shortest path is available, calculate a resource release for rerouting the first demand to its shortest path;

determine whether a second demand's shortest path is available; and based on a determination that the second demand's shortest path is available, calculate a resource release for rerouting the second demand to its shortest path; and selecting a subset of the plurality of network demands comprises:

compare the calculated resource release for rerouting the first demand and the calculated resource release for rerouting the second demand; and store whichever of the first and second demands has a higher resource release in the subset of the plurality of network demands.

11. The non-transitory computer-readable storage medium of claim 10, after releasing resources no longer used by rerouted demands based on the shortest path, the instructions are configured to repeat the collecting, selecting, rerouting, and releasing operations, wherein:

collecting a plurality of network demands is limited to the shortest available path and comprises:

determine whether a third demand has a shorter path available;

based on a determination that the third demand has a shorter path available, calculate a resource release for rerouting the third demand to its shorter path;

determine whether a fourth demand has a shorter path available; and based on a determination that the fourth demand has a shorter path available, calculate a resource release for rerouting the fourth demand to its shorter path; and selecting a subset of the plurality of network demands comprises:

compare the calculated resource release for rerouting the third demand and the calculated resource release for rerouting the fourth demand; and store whichever of the third and fourth demands has a higher resource release in the subset of the plurality of network demands.

12. The non-transitory computer-readable storage medium of claim 7, wherein the subset of the plurality of network demands is limited to 1, 2, or 3 network demands.

13. A system comprising:

a processor; and a computer-readable medium containing instructions, that when executed by the processor, are configured to:

collect a plurality of network demands, each of the plurality of network demands having a possible resource release by rerouting the network demand from its current path to a new path;

select a subset of the plurality of network demands that, if rerouted, has the highest net resource release without resource contention by:

iteratively picking one of the plurality of network demands with a maximum resource release; and reserving resources associated with the new path of the last picked network demand before a next iteration, wherein additional network demands are iteratively picked until no additional network demands may be rerouted to release resources;

reroute the subset of the plurality of network demands; and in response to rerouting the subset of the plurality of network demands, release resources no longer used by rerouted demands.

14. The system of claim 13, wherein the new path is determined based on either a shortest available path based on the network demand's current path and available resources or a shortest path.

15. The system of claim 14, wherein:

collecting a plurality of network demands is limited to the shortest path and comprises:
   determine whether a first demand's shortest path is available;
   based on a determination that the first demand's shortest path is available, calculate a resource release for rerouting the first demand to its shortest path;
   determine whether a second demand's shortest path is available; and
   based on a determination that the second demand's shortest path is available, calculate a resource release for rerouting the second demand to its shortest path; and selecting a subset of the plurality of network demands comprises:
   compare the calculated resource release for rerouting the first demand and the calculated resource release for rerouting the second demand; and
   store whichever of the first and second demands has a higher resource release in the subset of the plurality of network demands.

16. The system of claim 15, after releasing resources no longer used by rerouted demands based on the shortest path, the instructions are configured to repeat the collecting, selecting, rerouting, and releasing operations, wherein:

collecting a plurality of network demands is limited to the shortest available path and comprises:
   determine whether a third demand has a shorter path available;
   based on a determination that the third demand has a shorter path available, calculate a resource release for rerouting the third demand to its shorter path;
   determine whether a fourth demand has a shorter path available; and
   based on a determination that the fourth demand has a shorter path available, calculate a resource release for rerouting the fourth demand to its shorter path; and selecting a subset of the plurality of network demands comprises:
   compare the calculated resource release for rerouting the third demand and the calculated resource release for rerouting the fourth demand; and
   store whichever of the third and fourth demands has a higher resource release in the subset of the plurality of network demands.

17. The system of claim 13, the instructions further configured to repeat the collecting, selecting, rerouting, and releasing operations until there are no network demands to collect with a possible resource release by rerouting the network demand.

* * * * *